United States Patent
Concannon et al.

(10) Patent No.: US 10,896,209 B1
(45) Date of Patent: Jan. 19, 2021

(54) TRANSFORMATION OF TELECOMMUNICATION RECORDS

(71) Applicant: New York County District Attorney's Office, New York, NY (US)

(72) Inventors: Connor Concannon, New York, NY (US); Nathan Weber, New York, NY (US)

(73) Assignee: New York County District Attorney's Office, New York, NY (US)

( * ) Notice: Subject to any disclaimer, the term of this patent is extended or adjusted under 35 U.S.C. 154(b) by 76 days.

(21) Appl. No.: 16/134,277

(22) Filed: Sep. 18, 2018

(51) Int. Cl.
*G06F 16/30* (2019.01)
*G06F 16/29* (2019.01)
*H04L 29/06* (2006.01)
*H04W 8/18* (2009.01)
*H04W 4/021* (2018.01)
(Continued)

(52) U.S. Cl.
CPC ............ *G06F 16/29* (2019.01); *G06F 16/137* (2019.01); *G06F 16/9537* (2019.01); *H04L 69/08* (2013.01); *H04W 4/021* (2013.01); *H04W 8/18* (2013.01)

(58) Field of Classification Search
CPC .................................................... H04M 15/41
See application file for complete search history.

(56) References Cited

U.S. PATENT DOCUMENTS 5,680,611 A * 10/1997 Rail ..................... G06F 11/10
6,233,313 B1 * 5/2001 Farris ................... H04L 43/00
379/112.01

(Continued)

OTHER PUBLICATIONS

Article entitled "Cell Phone Investigations", Copyright 2012, by Edens.*

(Continued)

*Primary Examiner* — Mahesh H Dwivedi
(74) *Attorney, Agent, or Firm* — Fish & Richardson P.C.

(57) ABSTRACT

A method for automatically parsing non-uniform telecommunication data includes receiving a telecommunication record including a listing of communications between a first telecommunication device and second telecommunication devices, and, for each communication, one or more of: communication duration data, communication direction data, communication type data, communication date and time data, cell site references, and first or second telecommunication device identifiers. A telecommunication provider associated with the first telecommunication record is identified based on a format of the first telecommunication record. A telecommunication provider rule set is selected that defines how to transform the first telecommunication record into a normalized telecommunication record. The first telecommunication record is transformed according to the selected rule set to generate the normalized telecommunication record. Transforming the first telecommunication record includes mapping the cell site references to corresponding geographic locations according to a first cell site key and appending the geographic locations to the first telecommunication record. An interactive report can be generated to display a relationship between the first telecommunication device and the second telecommunication devices.

18 Claims, 17 Drawing Sheets

(51) Int. Cl.
*G06F 16/13* (2019.01)
*G06F 16/9537* (2019.01)

(56) References Cited

U.S. PATENT DOCUMENTS

| | | | | |
|---|---|---|---|---|
| 9,055,407 | B1* | 6/2015 | Riemer | H04M 1/72569 |
| 9,374,475 | B1* | 6/2016 | Frazier | H04M 15/41 |
| 9,854,397 | B1* | 12/2017 | Melson | G06Q 50/265 |
| 2003/0185363 | A1* | 10/2003 | Cerami | H04M 15/41 |
| | | | | 379/126 |
| 2006/0258339 | A1* | 11/2006 | Connelly | H04M 15/41 |
| | | | | 455/414.1 |
| 2007/0043760 | A1* | 2/2007 | Johannes Maria Meijer | |
| | | | | G06F 40/221 |
| 2007/0207774 | A1* | 9/2007 | Hutchinson | H04L 41/069 |
| | | | | 455/406 |
| 2010/0027771 | A1* | 2/2010 | Musko | H04M 15/00 |
| | | | | 379/112.06 |
| 2011/0295577 | A1* | 12/2011 | Ramachandran | H04W 4/025 |
| | | | | 703/6 |
| 2014/0122451 | A1* | 5/2014 | Euresti | G06F 16/174 |
| | | | | 707/693 |
| 2014/0161120 | A1* | 6/2014 | Ikaheimo | H04L 43/028 |
| | | | | 370/352 |
| 2015/0304863 | A1* | 10/2015 | Gupta | H04W 4/021 |
| | | | | 455/423 |
| 2015/0358475 | A1* | 12/2015 | Cleary | H04M 15/41 |
| | | | | 455/405 |
| 2016/0021637 | A1* | 1/2016 | Cao | H04M 3/2218 |
| | | | | 455/440 |

OTHER PUBLICATIONS

Article entitled "Get more answers from Call Detail Records using CellHawk software", dated Jul. 7, 2017, by Curtis.*
Article entitled "CellHawk" dated Oct. 16, 2015, by CellHawk.*
Article entitled "Hashing Call Detail Records", dated Apr. 1, 2012, by Forensic Focus.*
*Opinion of State v. Steele*, by the Appellate Court of Connecticut, dated Aug. 29, 2017.*
Article entitled "Exploring Home and Work Locations in a City from Mobile Phone Data", by Tongsinoot et al., Copyright 2017.*
Article entitled "The Limitations and Admissibility of Using Historical Cellular Site Data to Track the Location of a Cellular Phone", by Blank, dated 2011.*
Article entitled "What Your Cell Phone Can't Tell the Police", by Starr, dated Jun. 26, 2014.*
YouTube Video entitled "CDAMS Demo CDR Analysis", by CDAMS, uploaded on May 15, 2017, available at https://www.youtube.com/watch?v=VlkR8PAN5d4.*

* cited by examiner

Subscriber Info.   
Verizon User: (347) xxxxxxx
 xxxxxxx
 xxxxxxxxxxxxxxxxx   BRONX, NY.
104611451
 08/11/2007
Verizon User: (914) xxxxxxx
 xxxxxxxxxxxxxxxxx
 xxxxxxxxxxxxxxxxxxxxxxxxxxxxx, 109640050
 07/30/2007-NA
FIG. 7

Raw Data

| | Date & Time (EST) | Target Number | Phone Number | Direction | Type |
|---|---|---|---|---|---|
| 1 | 01/01/2014 12:58 AM | (914) xxx-xxxx | | | Exclude |
| 2 | 01/01/2014 12:58 AM | (914) xxx-xxxx | | | Exclude |
| 3 | 01/01/2014 12:58 AM | (914) xxx-xxxx | (845) xxx-xxxx | IN | Voicemail |
| 4 | 01/01/2014 01:27:17 AM | (917) xxx-xxxx | (917) xxx-xxxx | OUT | Call |
| 5 | 01/01/2014 01:28:09 AM | (917) xxx-xxxx | (917) xxx-xxxx | OUT | Call |
| 6 | 01/01/2014 01:36:47 AM | (917) xxx-xxxx | | IN | Text |
| 7 | 01/01/2014 01:36:48 AM | (917) xxx-xxxx | | IN | Text |
| 8 | 01/01/2014 02:14:00 AM | (914) xxx-xxxx | (845) xxx-xxxx | IN | Call |
| 9 | 01/01/2014 02:14:00 AM | (914) xxx-xxxx | | | Exclude |
| 10 | 01/01/2014 02:32:00 AM | (914) 643-8024 | (845) 494-8884 | OUT | Text |

Showing 1 to 10 of 116,751 entries

Previous 1 2 3 4 5 ... 11676 Next

FIG. 8

Communication Metrics

| Target | Number | Date Range | Incoming | Outgoing | Total | Mean Call Time (Minutes) | Mean Call Between Calls/Text (Hours) | Cumulative Call Time (Minutes) |
|---|---|---|---|---|---|---|---|---|
| (347)xxx-xxxx | (347)xxx-xxxx | 04/02/14 to 02/28/15 | 2783 | 793 | 3576 | 6.16 | 2.23 | 8579.95 |
| (347)xxx-xxxx | (646)xxx-xxxx | 04/02/14 to 02/28/15 | 2017 | 1157 | 3174 | 3.14 | 2.76 | 8896.25 |
| (917)xxx-xxxx | (917)xxx-xxxx | 01/01/14 to 04/02/15 | 1134 | 1730 | 2867 | 1.05 | 3.82 | 734.25 |
| (917)xxx-xxxx | (917)xxx-xxxx | 01/01/14 to 03/30/15 | 1715 | 992 | 2707 | 1.09 | 4.02 | 1610.77 |
| (347)xxx-xxxx | (347)xxx-xxxx | 04/02/14 to 04/01/15 | 1198 | 1123 | 2321 | 0.93 | 3.77 | 2150.43 |
| (917)xxx-xxxx | xxx-xxxx | 01/01/14 to 04/02/15 | 1808 | 0 | 1808 | | 6.06 | 0 |
| (917)xxx-xxxx | (718)xxx-xxxx | 01/01/14 to 04/02/15 | 1053 | 726 | 1779 | 0.93 | 6.16 | 1647.78 |
| (917)xxx-xxxx | (347)xxx-xxxx | 01/01/14 to 04/02/15 | 782 | 939 | 1701 | 0.99 | 6.44 | 1541.98 |
| (914)xxx-xxxx | (347)xxx-xxxx | 04/04/14 to 03/26/15 | 785 | 816 | 1601 | | 5.35 | 0 |
| (914)xxx-xxxx | (111)xxx-xxxx | 01/01/14 to 03/30/15 | 1534 | 0 | 1534 | | 7.09 | 364 |

Showing 1 to 10 of 3,639 entries

Previous 1 2 3 4 5 ... Next

FIG. 9

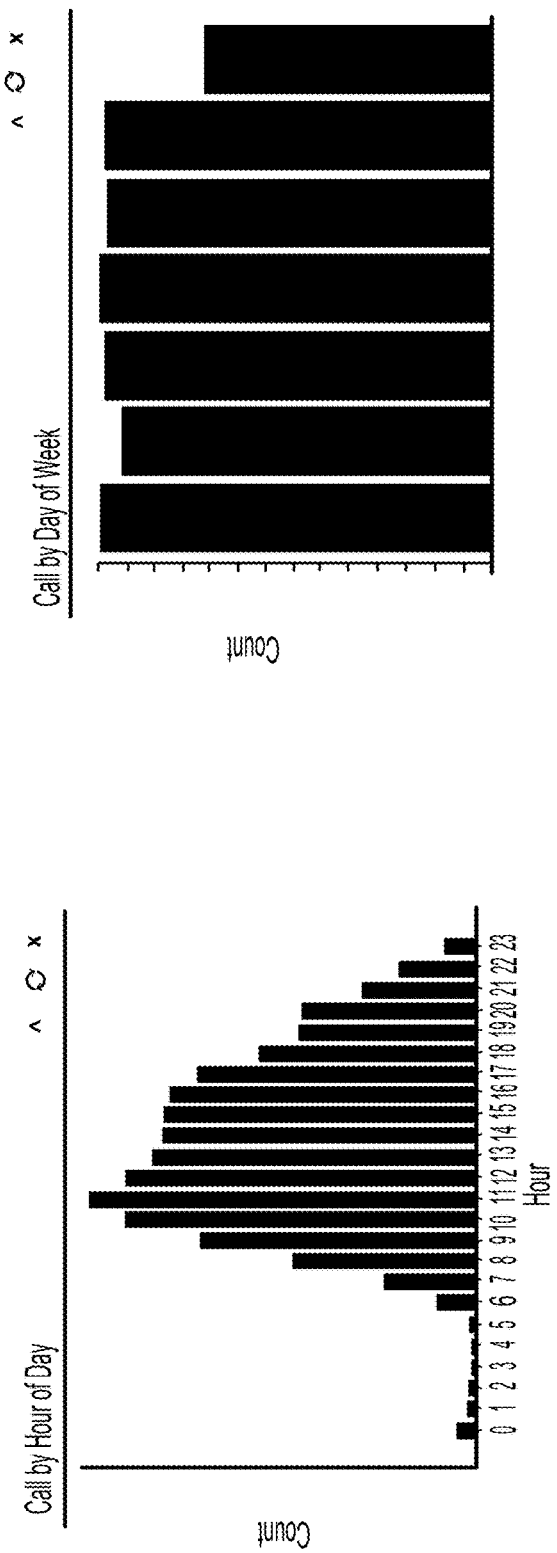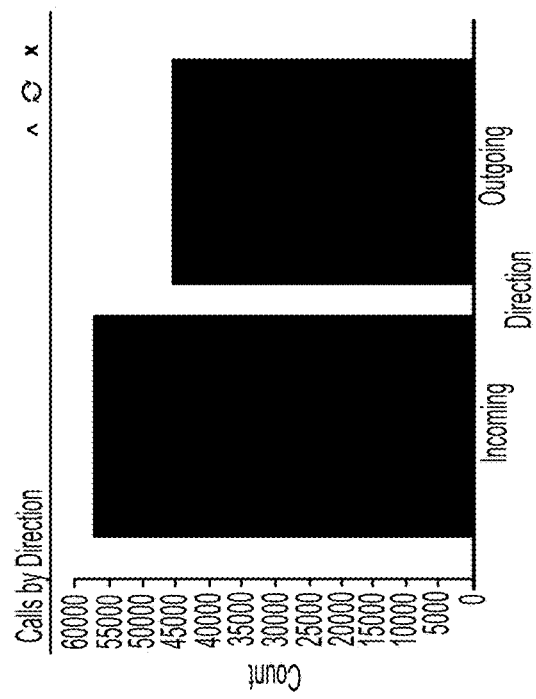
FIG. 10

| Numbers in Common | | ^ ⚙ X |
|---|---|---:|
| Number ⇕ | Target ⇕ | Calls ⇕ |
| (201) XXX-XXXX | (374) XXX-XXXX | 4 |
| (212) XXX-XXXX | (374) XXX-XXXX | 1 |
| (212) XXX-XXXX | (374) XXX-XXXX | 2 |
| (212) XXX-XXXX | (374) XXX-XXXX | 14 |
| (212) XXX-XXXX | (374) XXX-XXXX | 60 |
| (212) XXX-XXXX | (374) XXX-XXXX | 9 |
| (212) XXX-XXXX | (374) XXX-XXXX | 1 |
| (212) XXX-XXXX | (374) XXX-XXXX | 1 |
| (212) XXX-XXXX | (374) XXX-XXXX | 96 |
| (212) XXX-XXXX | (374) XXX-XXXX | 45 |

Showing 1 to 10 0f 310 entries

Previous   1   2   3   4   5   ...   31   Next

Call Detail Record Report: 00100/2016

*Generated by: concannonc*
*Generated on: 2018-01-29 11:47:12*

Filters Applied

Target Numbers: Date Range: 2013-12-31 through 2015-05-13
Timeframe: 0:00 through 23:59
Event Direction: All
Event Type: Call, Text, Voicemail, Exclude

Subscriber(s)

Search: [      ]

| Copy | CSV | | | | | | | |
|---|---|---|---|---|---|---|---|---|
| | Name ◆ | ODN ◆ | Address ◆ | Start ◆ | End ◆ | Carrier ◆ | Record Type ◆ | CASE_NUMBER ◆ |
| 1 | xxxxxx xxxx | xxxxxx xxxx | xxxxxx xxxxxxxx xxxxxxxx | 2007-08-11T04:00:00Z | | Verizon | Postpay | 00100/2016 |
| 2 | xxxxxx xxxx | xxxxxx xxxx | xxxxxx xxxxxxxx xxxxxxxx | 2007-07-30T04:00:00Z | | Verizon | Postpay | 00100/2016 |

Showing 1 to 2 of 2 entries

Previous [ 1 ] Next

Raw Data

Search: [      ]

| Copy | CSV | | | | | | |
|---|---|---|---|---|---|---|---|
| Date & Time ◆ | Target Number ◆ | Phone Number ◆ | Direction ◆ | Type ◆ | Duration ◆ | Cell Site ◆ | Latit |

TRANSFORMATION OF TELECOMMUNICATION RECORDS

BACKGROUND

Telecommunication records contain information representative of communications, such as telephone calls, text messages, and calls to voice mail, to and from target telephone numbers. Analysis of a telecommunication record can provide insight into the behavior of a person associated with a target telephone number, such as the person's communication patterns or the person's location.

SUMMARY

In an aspect, a computer-implemented method for automatically parsing non-uniform telecommunication data includes receiving, at one or more electronic processors, a first telecommunication record. The first telecommunication record includes a listing of at least one communication between a first telecommunication device and one or more second telecommunication devices, and, for each communication between the first telecommunication device and one of the second telecommunication devices, one or more of: communication duration data, communication direction data, communication type data, communication date and time data, first cell site reference, last cell site reference, a first telecommunication device identifier, and a second telecommunication device identifier for the one of the second telecommunication devices. The method includes identifying, from the first telecommunication record, a telecommunication provider associated with the first telecommunication record based on a format of the first telecommunication record; based on the identified telecommunication provider, selecting, from a plurality of telecommunication provider rule sets, a first telecommunication provider rule set that defines how to transform the first telecommunication record into a normalized telecommunication record; and transforming, by the one or more electronic processors, the first telecommunication record according to the selected first telecommunication provider rule set to generate the normalized telecommunication record. Transforming the first telecommunication record further includes a) mapping the first cell site reference and the last cell site reference of the first telecommunication record to geographic locations according to a first cell site key and b) appending the geographic locations to the first telecommunication record. The method includes generating, from the normalized telecommunication record, an interactive report that displays a relationship between the first telecommunication device and the one or more second telecommunication devices.

Embodiments can include one or more of the following features.

Generating the normalized telecommunication record includes deriving, for each communication within the normalized telecommunication record, a unique identifier based on information associated with the communication. The method includes applying a filter to the normalized telecommunication record and to previously normalized telecommunication records stored in a database to determine whether one or more communications within the normalized telecommunication record are duplicates of one or more communications within the previously normalized telecommunication records; and responsive to determining that one or more communications within the normalized telecommunication record are not duplicates, storing the one or more communications within the normalized telecommunication record in the database. Deriving the unique identifier is based on at least one of a portion of the communication duration data, a portion of the communication direction data, a portion of the communication type data, a portion of the communication date and time data, and the first telecommunication device identifier. The method includes computing a first hash of the first telecommunication detail record; comparing, prior to identifying the telecommunication provider, the first hash against a previously computed hash associated with a previously normalized telecommunication record; and when the first hash is different from the previously computed hash, allowing identification of the telecommunication provider to proceed. The communication type data includes an identifier as to whether a communication is an answered phone call, a text message, a phone call routed to voicemail, or an excluded event. The first telecommunication device identifier includes a first telephone number, and wherein the one or more second telecommunication device identifiers includes one or more additional telephone numbers, respectively. The communication direction data includes information as to whether a communication is an outbound communication from the first telecommunication device or an inbound communication to the first telecommunication device. The method includes selecting, prior to mapping the first cell site reference and the last cell site reference, the first cell site key from a plurality of cell site keys based on the communication date and time data within the first telecommunication record. The method includes receiving, at the one or more electronic processors, the first cell site key; and parsing the first cell site key to identify a telecommunication provider associated with the first cell site key and to identify a time frame during which the first cell site key is applicable for mapping cell site references to geographic locations.

In an aspect, a computing system for automatically parsing non-uniform telecommunication data, the computing system includes one or more electronic processors coupled to a memory, the electronic processors and memory configured to receive a first telecommunication record including a listing of at least one communication between a first telecommunication device and one or more second telecommunication devices, and for each communication between the first telecommunication device and one of the second telecommunication devices, one or more of: communication duration data, communication direction data, communication type data, communication date and time data, first cell site reference, last cell site reference, a first telecommunication device identifier, and a second telecommunication device identifier for the one of the second telecommunication devices. The electronic processors and memory are configured to identify, from the first telecommunication record, a telecommunication provider associated with the first telecommunication record based on a format of the first telecommunication record; based on the identified telecommunication provider, select, from a plurality of telecommunication provider rule sets, a first telecommunication provider rule set that defines how to transform the first telecommunication record into a normalized telecommunication record; and transform the first telecommunication record according to the selected first telecommunication provider rule set to generate the normalized telecommunication record. Transforming the first telecommunication record further includes a) mapping the first cell site reference and the last cell site reference of the first telecommunication record to geographic locations according to a first cell site key and b) appending the geographic locations to the first telecommunication record. The electronic processors and memory are configured to generate, from the normalized telecommunication record, an interactive report that displays a relationship between the first telecommunication device and the one or more second telecommunication devices. The computing system includes one or more databases configured to store the plurality of telecommunication rule sets and the normalized telecommunication record.

Embodiments can include one or more of the following features.

Generating the normalized telecommunication record includes deriving, for each communication within the normalized telecommunication record, a unique identifier based on information associated with the communication. The electronic processors and memory are configured to apply a filter to the normalized telecommunication record and to previously normalized telecommunication records stored in the database to determine whether one or more communications within the normalized telecommunication record are duplicates of one or more communications within the previously normalized telecommunication records; and responsive to determining that one or more communications within the normalized telecommunication record are not duplicates, store the one or more communications within the normalized telecommunication record in the database. Deriving the unique identifier is based on at least one of a portion of the communication duration data, a portion of the communication direction data, a portion of the communication type data, a portion of the communication date and time data, and the first telecommunication device identifier. The electronic processors and memory are configured to compute a first hash of the first telecommunication detail record; compare, prior to identifying the telecommunication provider, the first hash against a previously computed hash associated with a previously normalized telecommunication record stored in the database; and when the first hash is different from the previously computed hash, allow identification of the telecommunication provider to proceed. The communication type data includes an identifier as to whether a communication is an answered phone call, a text message, a phone call routed to voicemail, or an excluded event. The first telecommunication device identifier includes a first telephone number, and wherein the one or more second telecommunication device identifiers includes one or more additional telephone numbers, respectively. The communication direction data includes information as to whether a communication is an outbound communication from the first telecommunication device or an inbound communication to the first telecommunication device. The electronic processors and memory are configured to select, prior to mapping the first cell site reference and the last cell site reference, the first cell site key from a plurality of cell site keys based on the communication date and time data within the first telecommunication record. The electronic processors and memory are configured to receive the first cell site key; and parse the first cell site key to identify a telecommunication provider associated with the first cell site key and to identify a time frame during which the first cell site key is applicable for mapping cell site references to geographic locations.

BRIEF DESCRIPTION OF DRAWINGS

FIGS. 5-17 are screenshots of a user interface.

DETAILED DESCRIPTION

Telecommunication records contain information representative of communications, such as telephone calls, text messages, and calls to voice mail, to and from target telephone numbers. The format of a telecommunication record for a given target telephone number can vary based on factors including the telecommunication provider that provides telecommunication service for the target telephone number and the time period of the communications represented by the telecommunication record. Telecommunication records for various telecommunication providers can be transformed into normalized records having a standardized format according to rule sets for respective providers. A set of normalized records facilitates analysis of the information in the records, e.g., to identify communication patterns or anomalies in communication patterns, to determine a location of a person of interest, or other types of analysis. For instance, in a criminal justice context, telecommunication records for a suspect or a person of interest can be normalized and analyzed as part of a criminal investigation process.

Figure 1:
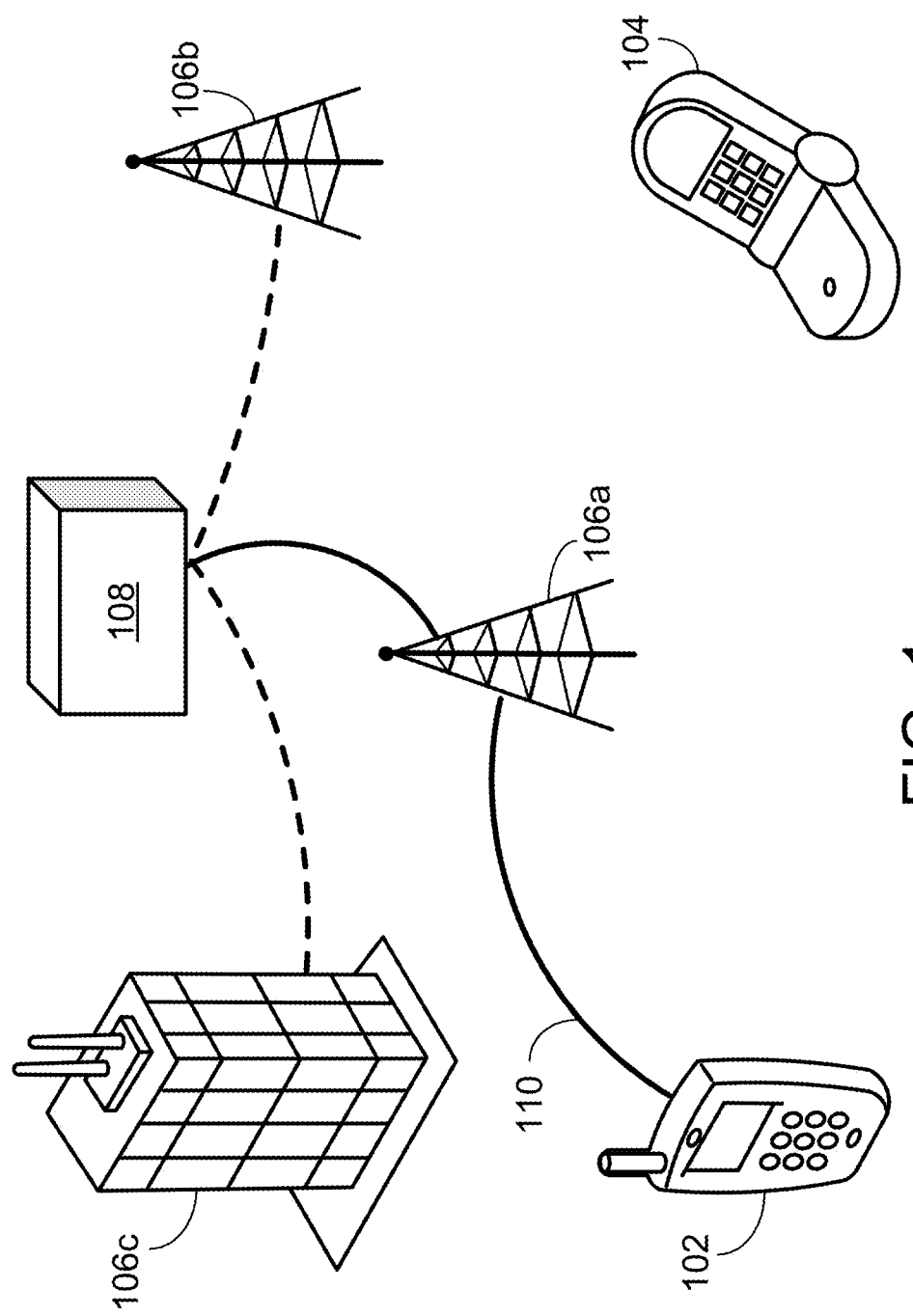
FIG. 1 is a diagram of a cellular network.

Referring to FIG. 1, a first telecommunication device 102, such as a cell phone, tablet, watch, or other type of telecommunication device, communicates with a second telecommunication device 104 in a cellular telephone network 100. The communication can be a telephone call, a text message, a telephone call to voice mail, or another type of communication. The communication can be inbound to the first telecommunication device 102 from the second telecommunication device 104 or can be outbound from the first telecommunication device 102 to the second telecommunication device 104. Each telecommunication device 102, 104 is identified by an identifier, such as a phone number. Each telecommunication device 102, 104 receives telecommunication service from a telecommunication provider. The devices 102, 104 can have the same telecommunication provider or can have different telecommunication providers.

In a cellular telephone network, multiple cells are defined in a geographic region. A cell site 106a, 106b, 106c (referred to collectively as cell sites 106) in each cell provides cellular network coverage for telecommunication devices in the respective cell. Cell sites 106 are connected to telephone exchanges 108, which in turn are connected to public telephone networks, to enable communications between telecommunication devices. Cell sites 106 can be cell towers, buildings, light poles, or other sites. Each cell site 106 is identified by an identifier, referred to as a cell site reference. Each cell site 106 is located at a geographic location that can be described in terms of a street address, latitude and longitude coordinates, coordinates in another reference frame, or another type of geographic descriptor.

Each cell site 106 is associated with a data transmission channel through which communication data is transmitted to and from telecommunication devices in the vicinity of the cell site. For instance, in a communication to or from the first telecommunication device 102, the telecommunication device 102 uses the data transmission channel of a particular cell site, such as the cell site 106a closest to the first telecommunication device (shown as a bolded connection 110). As the first telecommunication device 102 moves away from the cell site 106a and into the vicinity of another cell site (e.g., cell site 106b), the telecommunication device 102 switches from the data transmission channel of the cell site 106a to the data transmission channel of the cell site 106b. This switch from the data transmission channel of a first cell site to the data transmission channel of a second cell site is referred to as a handoff from the first cell site to the second cell site.

The cell site through which data is transmitted at the beginning of a communication is referred to as the initial cell site. The cell site through which data is transmitted at the end of a communication is referred to as the final cell site. Other cell sites that are used during a communication are referred to as intermediate cell sites.

A telecommunication record includes a listing representative of one or more communications between a target phone number and each of one or more secondary phone numbers over a specified period of time. For instance, a telecommunication record can include, for each communication, information such as the date, time, or duration of the communication, cell site references for cell sites used in the communication, the type of communication (e.g., telephone call, text message, call to voicemail, or another type of communication), direction of the communication (e.g., inbound to the target phone number or outbound from the target phone number), or other information.

In an investigation, such as a criminal investigation, the behavior of a person (e.g., a suspect or person of interest) can be analyzed based on communications to and from that person's phone number (e.g., the phone number of a telecommunication device known or suspected to be used by that person). Telecommunication records for that phone number (referred to as the target phone number) can be obtained, e.g., by subpoena or court order. Analysis of telecommunication records for a target phone number of a person of interest can reveal information about the person's activities. For instance, the pattern of communications between the target phone number and other phone numbers (referred to as secondary phone numbers) can help identify the person's associates. The days and times at which communications with the target number occurred can provide an indication of the person's activities during a given period of time. The cell sites that routed the person's communications can reveal the person's location at certain points in time. This information, and other types of information, can be useful for in a criminal investigation, e.g., to place a suspect in the vicinity of a crime scene, to corroborate an alibi, to identify unusually high communication volumes in the days preceding a crime, or other activities.

Telecommunication records from different telecommunication providers can have different formats. For instance, the fields contained in telecommunication records from different telecommunication providers can be in different orders, the data in the fields can have different formats, different fields can be present, or other format differences. To facilitate analysis of telecommunication records across multiple telecommunication providers, telecommunication records are transformed into normalized records having standardized format according to rule sets specific to the respective telecommunication providers.

Figure 2:
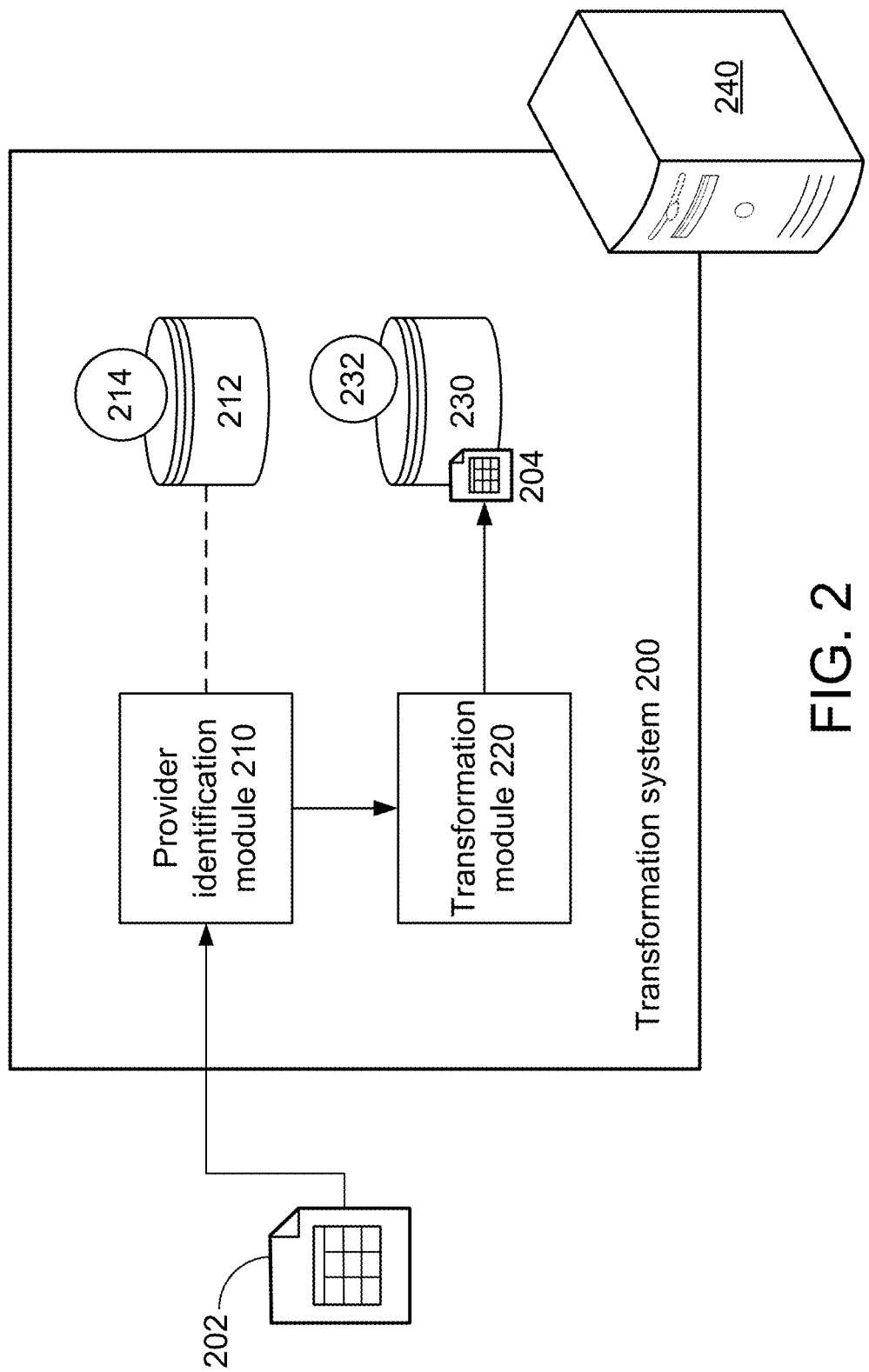
FIG. 2 is a diagram of a computing system.

Referring to FIG. 2, a transformation system 200 transforms telecommunications records into normalized telecommunications records having a standardized format according to rule sets defining the transformation.

A telecommunication record 202 for a target telephone number includes a listing representative of communications (e.g., telephone calls, text messages, calls to voicemail, or other types of communications) between the target telephone number and one or more secondary telephone numbers within a target time period. The target telephone number identifies a first telecommunication device. Each secondary telephone number identifies a corresponding second telecommunication device. For each of the communications represented in the telecommunication record 202, the telecommunication record 202 can include data descriptive of the communication, such as one or more of the following fields:

The target telephone number or another identifier of the target telecommunication device;
The secondary telephone number or another identifier of the second telecommunication device;
A type of the communication, e.g., an answered telephone call, a text message, a telephone call to voicemail, or another type of communication;
A direction of the communication, e.g., inbound to the target telephone number or outbound from the target telephone number;
A date of the communication;
A start time of the communication, an end time of the communication, or both;
A duration of the communication;
A cell site reference for each of one or more cell sites for the communication, e.g., a cell site reference for an initial cell site for the communication, a cell site reference for an intermediate cell site for the communication, or a cell site reference for a final cell site for the communication.

The format of a telecommunication record encompasses the fields included in the telecommunication record the order of the fields, and the format of data within each field. For instance, example formats of data in a date field can include DDMMYY, DDMMYYYY, and MMDDYYYY, among other formats. Example formats of data in a time field can include times given in a time zone local to the telecommunication device and times given in a standard time zone (e.g., Eastern Standard Time (EST), Universal Coordinated Time (UTC), or another standard time zone).

The format of a telecommunication record for a given telephone number depends on the telecommunication provider that provides telecommunication service for that telephone number (referred to as the telecommunication provider for the record). For some telecommunication providers, the format of a telecommunication record can also depend on the dates of the communications represented by the telecommunication record. For instance, for a given telecommunication provider, telecommunication records for communications occurring between 2010-2015 can have one format while telecommunication records for communications occurring after 2015 can have a different format.

To transform the telecommunication record 202 into the normalized record 204, a provider identification module 210 identifies the telecommunication provider for the telecommunication record 202. The provider identification module 210 can identify the telecommunication provider based on information in the telecommunication record, such as information in the file header of the record (e.g., a name or identifier of the telecommunication provider), information in one or more column headers of the record, or other information in the record.

A rules database 212 stores rule sets 214 for each of multiple telecommunication providers. A rule set 214 for a given telecommunication provider defines the transformation into a normalized record for a telecommunication record for that telecommunication provider. For instance, the rule sets 214 can define changes in the order of fields. The rule sets 214 can define changes in data format (e.g., for telecommunication records in which times are given in local time zones, the rule set can define a transformation from local time to a standard time, e.g., Universal Coordinated Time (UTC)). In some examples, the rule sets 214 can be specific to certain time periods, e.g., when the format of a telecommunication record depends on the dates of the communications represented by the telecommunication record.

A transformation module 220 transforms the telecommunication record 202 into the normalized record 204 according to the particular rule set 214 for the telecommunication provider identified by the provider identification module 210. The normalized record 204 is stored in a records database 230, from which the normalized record 204 can be accessed for analysis.

Examples of fields in the normalized record 204 can include one or more of the following fields for each communication represented in the record:

Communication Date. The format of the date is normalized to a standard date format, such as DDMMYYYY, DDMMYY, MMDDYYYY, or another date format.

Communication Time. The start time of the communication, end time of the communication, or both. The times are normalized to a standard time zone, e.g., to Universal Coordinated Time (UTC), Eastern Standard Time (EST), or another standard time zone.

Duration: The duration of a call or voicemail, e.g., in minutes or seconds or another unit. Text messages and excluded events can be assigned null values for the duration field. An excluded event is an artifact of the cellular communication protocol (e.g., a routing of a call between cell sites that is logged as a distinct event), a duplicative row, or another type of event.

Target Number. The target number is normalized to a standard format, e.g., (123)456-7890, with the leading 1 excluded when it is a United States-based number.

Secondary Number. The secondary number is normalized to a standardized format, e.g., the same format as the format of the target number.

Communication Type. An identifier of the type of communication, e.g., telephone call, text message, call to voicemail, or an excluded event. The communication type identifiers can be mutually exclusive.

Communication Direction. An indicator of whether the communication was inbound to the target number or outbound from the target number. In some examples, the communication direction for a given communication can be unknown and the communication direction identifier can indicate an unknown direction or can be assigned a null value.

First Cell Site Reference. A reference, such as a name or identification number, of the cell site used at the initiation of the communication.

First Latitude: The latitude of the first cell site.

First Longitude: The longitude of the first cell site.

Last Cell Site Reference. A reference, such as a name or identification number, of the cell site used at the termination of the communication.

Last Latitude: The latitude of the last cell site.

Last Longitude: The longitude of the last cell site.

In some examples, some of the fields listed above are not included in the normalized record. In some examples, additional fields are included in the normalized record. In some examples, the fields in the normalized record can be in an order different from the order of the fields listed above. In some examples, one or more of the fields in the normalized record can have a format different from the format described above.

In some examples, cell site references are not fixed to physical cell sites. For instance, a cell site (e.g., a tower) can have a first cell site reference during a first time period and a second, different cell site reference during a second time period. A cell site can have its cell site reference changed due to, e.g., a telecommunication provider constructing additional cell sites, relocating cell sites, changing the cell site reference system, or for other reasons.

The transformation module 220 can access a listing of cell site keys mapping cell site references to corresponding geographic locations of cell sites (e.g., latitude and longitude coordinates, street addresses, or other locations) when transforming the telecommunication record into a normalized record. For instance, a listing 232 of cell site keys can be stored in the records database 230 for access by the transformation module. The transformation module 220 can access the listing 232 of cell site keys to determine one or more geographic identifiers (e.g., street address, latitude and longitude coordinates, or other geographic identifiers) corresponding to each cell site reference in the telecommunication record 202.

In some examples, the listing of cell site keys can be a listing mapping cell site references to corresponding geographic locations of cell sites and to corresponding time periods. The transformation module 220 can identify the cell site reference in the listing that matches the cell site reference in the telecommunication record for the time period of the communications represented by the telecommunication record.

In some examples, the system 200 can transform subscriber records from a provider-specific format into normalized subscriber records having a standardized format. A subscriber record is a record including a listing representative of one or more subscribers of a given telecommunication provider and can include information descriptive of the subscribers, such as names, addresses, telephone numbers, or other information. Normalized subscriber records can be stored in the records database 230, e.g., in a separate table from a table storing the normalized records 204; or can be stored in a distinct database.

The provider identification module 210 and the transformation module 220 can be implemented on one or more processors, e.g., distributed across multiple computing systems 240. Each of the provider rules database 212 and the records database 230 can be stored on the same computing system as the processor(s) implementing the modules 210, 220, or can be stored on one or multiple different computing systems. In the example of FIG. 2, the databases 212, 230 are stored on the same computing systems 240 as the modules 210, 220.

Figure 3:
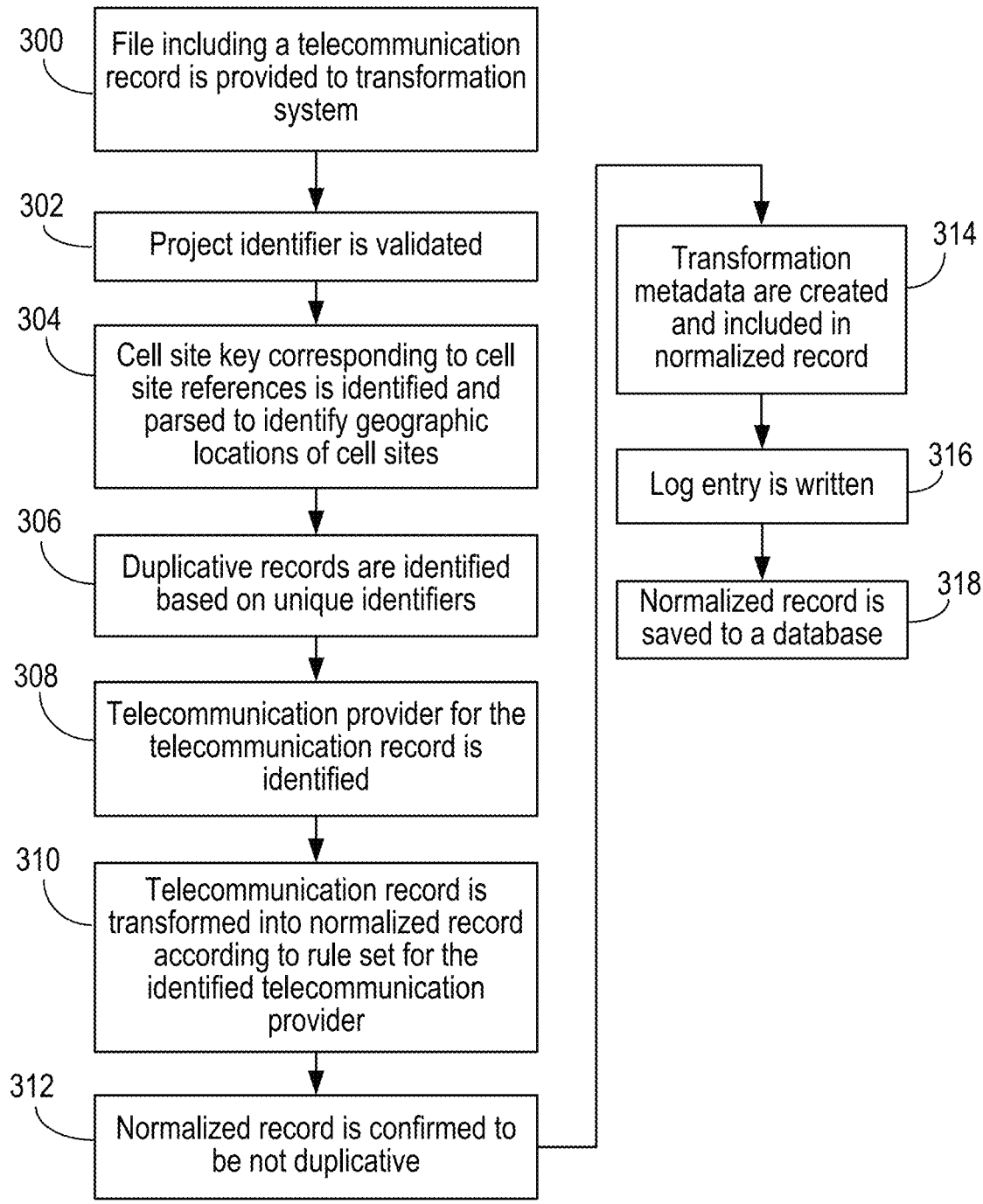
FIG. 3 is a flow chart.

Referring to FIG. 3, in an example process performed by one or more electronic processors in a single computer system or distributed across multiple computer systems, a telecommunication record for a specific telecommunication provider is transformed into a normalized telecommunication record according to a rule set for the telecommunication provider. In some examples, the actions illustrated in FIG. 3 are carried out in a different order.

A file including one or more telecommunication records to be normalized is provided to a transformation system (300). For instance, the file can be uploaded to the system and stored in a temporary storage, such as a queuing directory. Each telecommunication record in the file includes a listing representative of communications between a target telephone number and one or more secondary telephone numbers within a target time period. For simplicity, FIG. 3 refers to a process in which the file includes a single telecommunication record.

A project identifier can be provided along with the file. For instance, in the context of a criminal justice investigation, the project identifier can be an investigation number, an arrest number, a docket number, or an indictment number, or another type of identifier. The project identifier is validated against a listing of project identifiers (302), such as a listing of active case numbers. In some examples, the file can be uploaded to the system upon validation of the project identifier. In some examples, the project identifier can be stored in association with the file so that the project identifier can later be incorporated into the resulting normalized record. In some examples, the file can be stored in a directory corresponding to the project identifier.

A cell site key corresponding to the cell site references for each communication represented in the telecommunication record is identified and parsed to identify geographic locations (e.g., latitude and longitude coordinates, street addresses, or other location identifiers) corresponding to the cell site references (304). In some examples, parsing the cell site key can also include identifying the telecommunication provider for the telecommunication record. The geographic location(s) for each communication are appended to the telecommunication record in association with the corresponding communication.

In some examples, a listing of cell site keys mapping cell site references to corresponding geographic locations can be provided in the file or along with the file. The listing of cell site keys can be specific to the time period of the communications represented in the telecommunication record, specific to the telecommunication provider for the record, or both. The cell site key corresponding to the cell site reference for a given communication is identified. The geographic location mapped to that cell site reference by the identified cell site key is identified and appended to the telecommunication record.

In some examples, a listing of cell site keys for various time periods, various telecommunication providers, or both, can be stored in the system and the system can select the cell site key that is applicable to the communications represented in the telecommunication record. For instance, the system can select the cell site key based on the time period of the communications, based on the telecommunication provider, or both. In some examples, the telecommunication provider for the telecommunication record is identified (see 308, below) prior to selecting the cell site key. The cell site key corresponding to the cell site reference for a given communication in the appropriate time period is identified and parsed to identify the geographic location of the cell site reference.

A unique identifier, such as a hash (e.g., an SHA1 hash) of the telecommunication record is computed by the one or more electronic processors based on information in the telecommunication record. The computed unique identifier is compared to unique identifiers (e.g., hashes) computed for previously normalized telecommunication records to confirm that the telecommunication record has not already been uploaded and normalized, e.g., that the telecommunication record is not a duplicate of one of the previously normalized telecommunication records (306). The hash is computed based on binary information in the telecommunication record prior to normalization. If two records are different, e.g., if even one character is different between one record and another, the hash of the two records will be different. In some examples, the filename is not used in the hashing process such that two files with the exact same data but different filenames would be identified as duplicates. If the unique identifier of the telecommunication record is different from the unique identifier of each of the one or more previously normalized telecommunication records, the telecommunication record is confirmed to be a non-duplicative record and further processing of the telecommunication record proceeds. If the unique identifier of the telecommunication record matches the unique identifier of one of the previously normalized telecommunication records, the telecommunication record is determined to be duplicative and further processing does not proceed. A notification that the telecommunication record is duplicative can be provided to a user, e.g., on a user interface.

The identification of duplicative records can prevent telecommunication records from being uploaded to the system multiple times, which could comprise the accuracy of downstream data analysis. The identification of duplicative records can prevent telecommunication records from being uploaded to more than one case. In some examples, a user can override the determination of duplicative records, e.g., to allow a duplicative telecommunication record to be uploaded to two distinct cases.

The telecommunication provider associated with the telecommunication record is identified (308) based on information in the telecommunication record. The information can include information explicitly identifying the telecommunication provider, such as information in a file header of the record, information in a column header, cell site references, or other information that can be located throughout the record. The information can include format information specific to the telecommunication provider, such as the order of fields in the telecommunication record, the format of data in one or more fields of the telecommunication record, or other format information. In some examples, the format information can be specific to both a particular telecommunication provider and to communications occurring in a particular time period. In some examples, the telecommunication provider can be identified at another point in the process, e.g., before parsing of the cell site key, before identification of duplicative records, or at another point.

The telecommunication record is transformed into a normalized record having a standardized format according to a rule set for the identified telecommunication provider (310). In some examples, the transformation is performed according to a rule set for the identified telecommunication provider that is specific to the time period of the communications represented by the telecommunication record. The rule set defines the transformation, such as changes in the order of fields, changes in data format, or other changes. The rule set for a transformation sets out specific characteristics that enable automatic transformation, on a field-by-field basis, of a telecommunication record into a normalized telecommunication record without manual user involvement.

The following is a specific example of a portion of a rule set for transformation of a telecommunication record into a normalized record:

In some examples, a second confirmation that the telecommunication record is not duplicative is carried out based on the data in the normalized record (312). For instance, data in the normalized record, such as the record type, the target phone number, the number of rows in the normalized record, the start or end time of the communications represented in the record, or other data are compared to data in one or more previously normalized records. If the data in the normalized record do not match the data in the previously normalized records, the normalized record is confirmed to be non-duplicative. If the data in the normalized record match the data in one of the previously normalized records, the normalized record is determined to be duplicative and processing does not proceed. This second confirmation that the telecommunication record is not duplicative addresses the possibility that a telecommunication record may contain the same data as a previously normalized telecommunication record but may have a different unique identifier (e.g., hash value), for instance, due to data storage artifacts, and thus may not be identified as a duplicative record (see 306, above).

Transformation metadata associated with the creation of the normalized record and the transformation of the telecommunication record into the normalized record can be created and included in the normalized record, e.g., in a header of the normalized record (314). The transformation metadata can include one or more of the following:

- An identifier (e.g., a name) of the telecommunication provider.
- The project identifier associated with the telecommunication record.
- An identifier of the file in which the telecommunication record was provided to the system, such as a filename.
- A record type indicator indicating a system (e.g., a computing system or software platform) that created the telecommunication record.
- Calculated value unique to the communication information in the normalized record, such as a bloom filter value (discussed below).
- File hash: The unique identifier (e.g., hash value, such as SHA1) value calculated during duplicate recognition (see 306, above).
- Original order. The original order of the fields in the telecommunication record.

In some examples, some of the parsing metadata listed above are not included in the normalized record. In some examples, additional parsing metadata are included in the normalized record, such as a date or time of the parsing, an identifier of a user who initiated the parsing, or other parsing metadata. In some examples, the parsing metadata in the normalized record can be in an order different from the order of the parsing metadata listed above.

A log entry is written to a log (316). The log entry can also include an indication of whether the normalization process failed or succeeded. In some examples, if the normalization process failed, the log entry can include an indication of the reason for failure, such as that the telecommunication record was determined to be duplicative, the telecommunication provider could not be identified, no rule set existed for the identified telecommunication provider in the relevant time period, or another reason.

The normalized telecommunication record is saved to a database (318), such as a SQL database. In some examples, the database can include a table for storing normalized telecommunication records and a table for storing normalized subscriber information.

A unique identifier, such as a bloom filter value, can be computed by the one or more electronic processors for each entry in the telecommunication record to filter out duplicate entries (e.g., entries representative of the same communication) in a single normalized record or across multiple normalized records. For instance, filtering out duplicate rows can address a situation in which a user retrieves telecommunication records from overlapping time frames. Filtering out duplicate rows can also address a situation in which two telecommunication records are normalized with identical information, except that one of the telecommunication records includes cell site references and the other lacks cell site references. Filtering duplicate rows can distinguish these and other similar situations, in which the same communication is represented in multiple records, from situations in which multiple rows appear to be duplicative while actually representing different communications. For instance, text messages can be sent quickly, e.g., at a rate of more than one per second, and thus multiple rows representing text messages at the same time may not be duplicative.

To implement a bloom filter, a value is calculated by the one or more electronic processors that is unique to the fields in the normalized records. For instance, the normalized data is sorted through in a specific order, such as in the following order: Date, Time, Target Phone Number, Direction, Duration, Secondary Phone Number, and Type. After sorting, rows that appear to represent duplicative information are next to one another. The columns previously sorted on are concatenated together into a value referred to as a bloom value. In an example, the bloom value for fields in the order given above is "01/01/15 02:33:22 PM(123)456-7890IN0 (234)456-0987TEXT." The bloom value is unique to the date, time, target number, direction, duration, secondary number, and type. However, the bloom value is agnostic to the presence of cell site references; duplicate rows with and without cell site references receive the same bloom value.

The newly created bloom values are looped through to compare each bloom value to the bloom value for the previous row. If the bloom values of two rows are different, a value of 0 is assigned to the rows. If the bloom values are the same across multiple rows, each row is assigned a value incremented by 1 over the value of the previous row. For instance, if there are two rows that have the same bloom value, the rows are assigned values of 0 and 1. If there are three rows that have the same bloom value, the rows are assigned values of 0, 1, and 2. The values are appended to the rows in a unique index column.

The bloom value and the value in the unique index column for each row are concatenated together and passed through a hashing algorithm, e.g., a hashing algorithm that produces the first eight characters of the md5 hash. This value, referred to as the bloom filter, is statistically unique. Moreover, rows with and without cell site references, but that are otherwise identical, will be assigned the same bloom filter value. When records are displayed or analyzed, rows with duplicate bloom filter values are removed from display or analysis, preserving the duplicate row that has cell site references and discarding the duplicate row without the cell site references.

In an example, the transformation of a telecommunication record into a normalized record can occur according to the following computer-implemented rule set.

[Omitting the carrier identification]
if provider=Verizon
  a. Identify the target number and format it to (000)000-0000
  b. Determine and normalize directionality and communication type
  c. Perform conversion from tower local time to Universal Coordinated Time
  d. Set duration as an integer. Verizon reports communications in units of seconds by default; some carriers do not
  e. Identify phone number that is calling, or is called by, the target number
  f. If cell site information is present:
    i. Create tower names
    ii. Query database for matching tower names iii. Identify towers closest in time to telecommunication record (spatial closeness is inherent in the tower name)
iv. Else, set tower information to null
g. Save original order of telecommunication records
h. Append file hash to each row of telecommunication records
i. Calculate bloom value using fields in [xxx]
j. Write normalized telecommunication records to SQL database
k. Log parsing success or failure and metrics to log file Multiple software components can be used in a framework to transform a telecommunication record into a normalized record. For instance, python, SQL, and R components can be used to accomplish the record transformation. Python is a general-purpose programming language that is generally deployed for transforming and cleaning the telecommunication records into usable data. R is a statistical programming language that is generally deployed to load and manipulate the transformed data. Shiny is an R package that facilitates the creation of interactive analyses and reports by performing functions and updating outputs based on user input.

Figure 4:
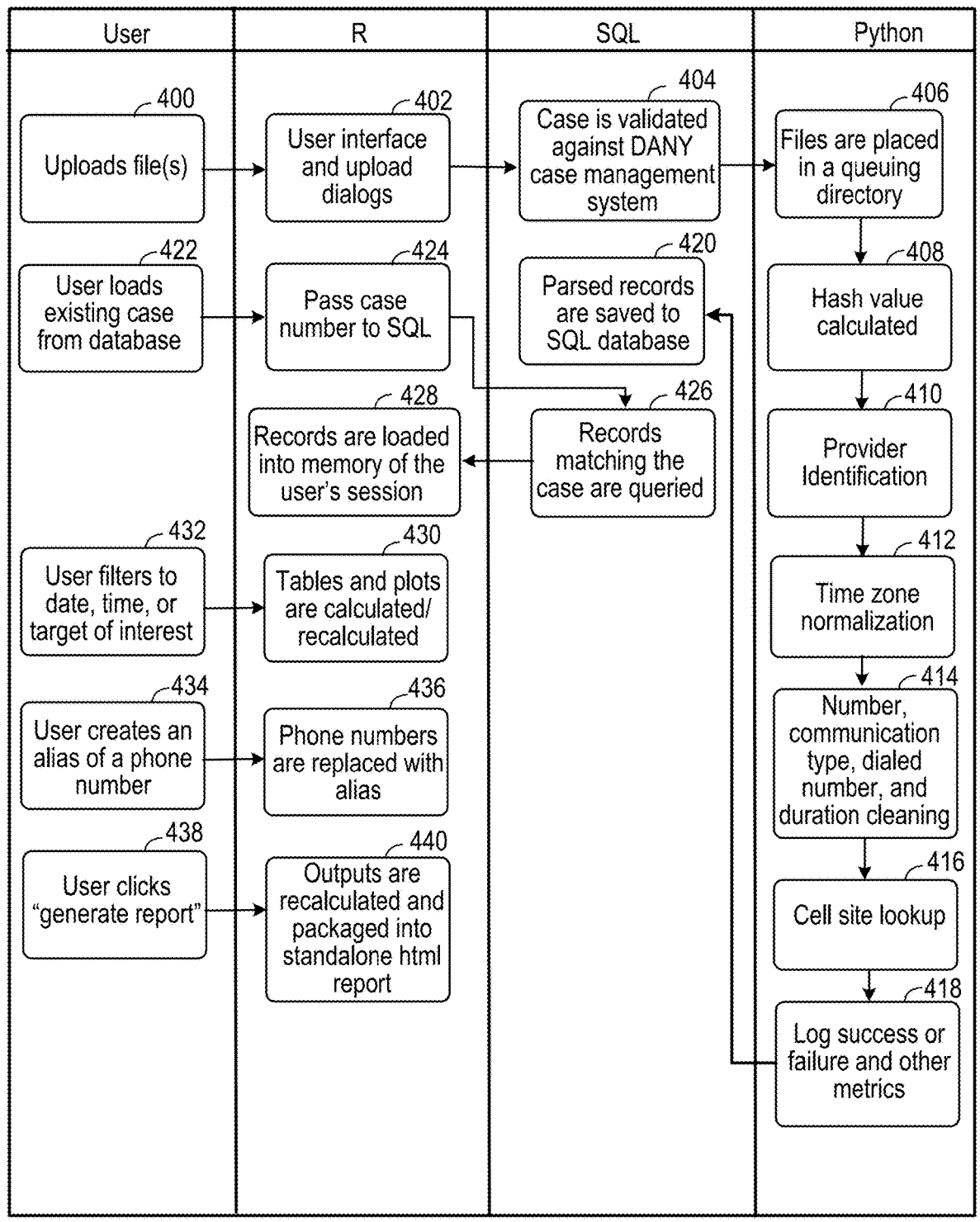
FIG. 4 shows an example of an operation of a framework implemented by multiple software components.

FIG. 4 shows an example of the operation of the framework implemented by multiple software components. A user uploads one or more files each including one or more telecommunications records (400). The user interface and upload dialogs can be provided by R (402), e.g., using an RODBC package to interact with SQL databases. The project identifier is validated against a listing of project identifiers, e.g., a listing of case numbers in a case management system, using SQL database technology (404). The uploaded file is placed into a queuing directory using a Python function (406).

Python procedures are executed to perform a sequence of data manipulating and transformation functions, including calculate a hash value for each telecommunication record (408), identifying the telecommunication provider for each telecommunication record (410), normalizing the time zone for time fields in the telecommunication record (412), transforming data in the telecommunication record into the standardized format of the normalized record (414), looking up cell site keys (416), and logging information about the transformation (418). A variety of Python libraries can be used, including Numpy, for computation and numerical operations; Pandas, for working with and transforming tabular data; Hashlib, for implementation of a variety of secure hashing algorithms; Sqlalchemy, for interacting with SQL databases; and Pytz, for manipulating time zones.

The normalized records are saved to a SQL database (420). The SQL database can include multiple tables, such as a table for normalized records based on transformed telecommunication records, a table for normalized subscriber records, and cell site reference tables.

To analyze normalized records saved in the SQL database, a user loads an existing case, e.g., by project identifier (422). The project identifier is passed to the SQL database by an R function (424), e.g., implemented in a Shiny package. The SQL database is queried to identify records matching the project identifier (426) and the identified records returned responsive to the query are loaded into memory of the user's session by an R function (428).

Once the data is loaded into memory, calculations that generate summary statistics, display graphs and plots, or output other data elements can be performed by R functions (430), e.g., using Shiny functionality. Upon input from the user, the data can be filtered or manipulated, e.g., by date, time, phone number of interest, or in other ways (432), and the statistics, graphs, plots, or other outputs can be updated responsive to the filtering (430). This filtering capability can allow the user to explore the call activity of a target subject (e.g., a person of interest or a suspect in an investigation) during a certain time frame, identify one or more other subjects who communicate with a target subject, or other communication patterns.

The user can create an alias of a phone number (e.g., the target phone number or one or more secondary phone numbers) (434) that can replace the phone number in textual or graphical displays (436) for easier readability. Once created, the user can toggle between display of the phone number and display of its alias. The alias can be saved to the SQL database in association with a normalized record or a subscriber record.

The user can generate a report (438) to memorialize the results of the analysis carried out through the system. Responsive to a user request to generate a report, the outputs (e.g., statistical analysis, graphs, plots, or other outputs) are recalculated using an R function and packaged into a stand-alone report, such as an html report (440). The report can be time stamped and labeled to indicate the state of the data. The reports can be static or can retain an interactive characteristic.

A variety of R packages can be used to carry out the functionality described with respect to FIG. 4. RODBC is a package to interact with SQL and handles the loading and saving of data within R. ggplot2 is a plotting package used for bar graphs. Dplyr is a package responsible for data manipulation and aggregation and can be used for calculations once the requested records are loaded into memory. Datatables is a package that provides an interface to a Javascript library for display of data in a table format. Shinyjs is a package that facilitates communication between Javascript and Shiny. AnomalyDetection is a package that facilitates identification of anomalies in time series data. AnomalyDetection can generate a plot with communication activity by date including a graphical feature (e.g., a horizontal line) indicating an average (e.g., mean or median) volume of communication activity, and can highlight dates on which the volume of communication activity is anomalous compared to previous or future trends. Rmarkdown and knitr are packages that generate documents based on R commands, e.g., to generate standardized outputs for user reports.

FIGS. 5-17 are screenshots of an example environment in which normalized records can be analyzed, e.g., according to the framework of FIG. 4.

Figure 5:
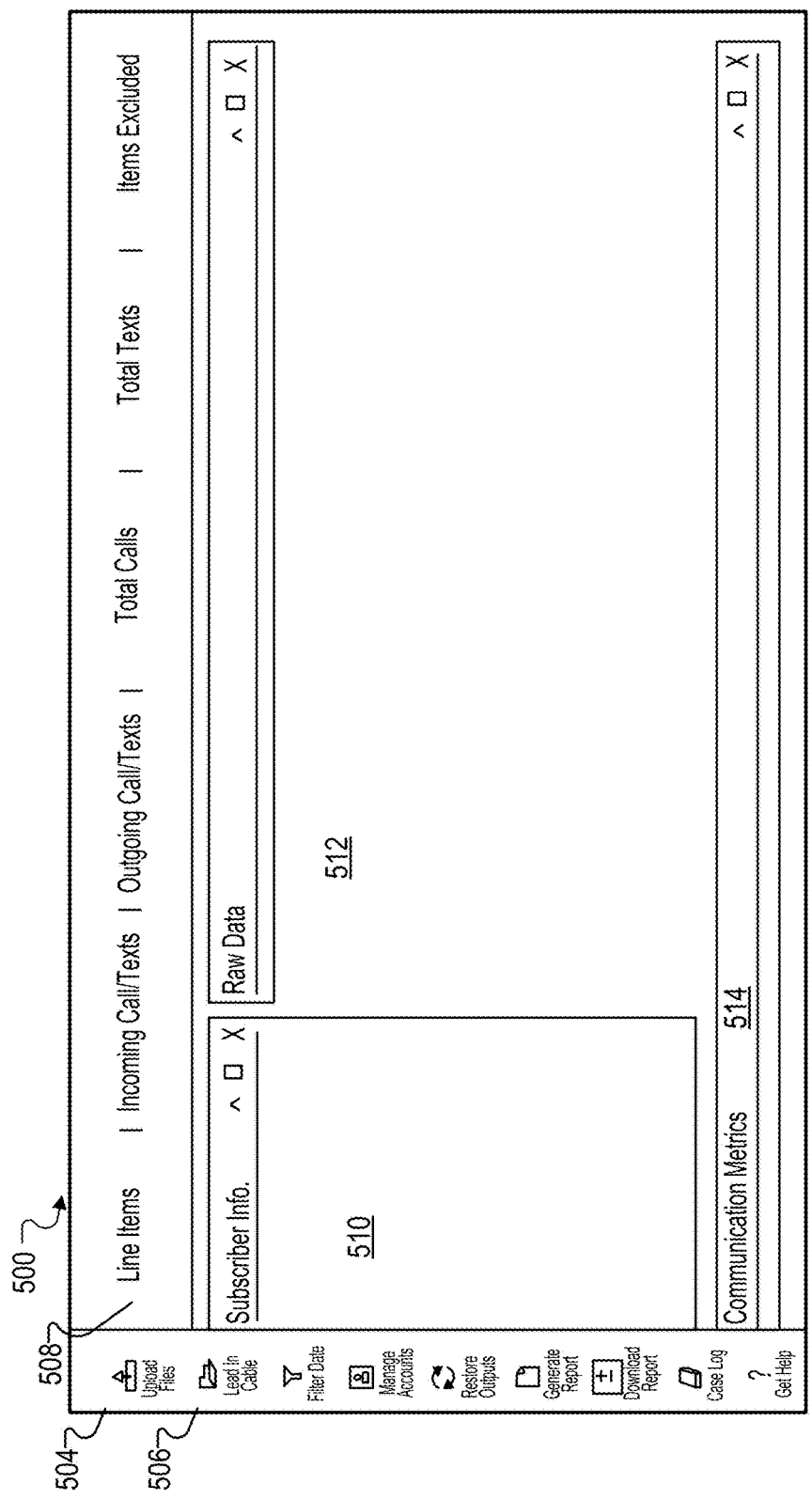
Figure 6:
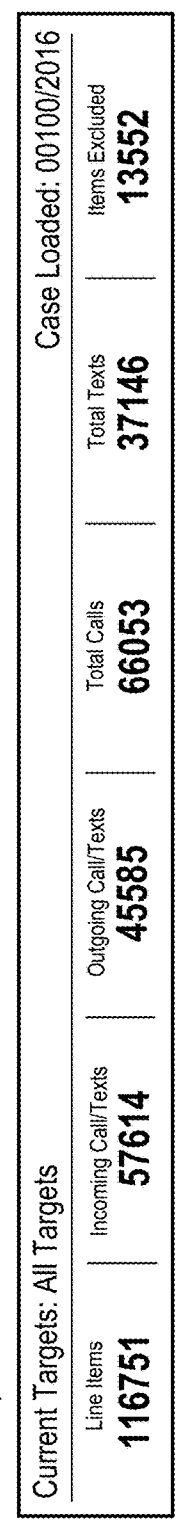

Referring to FIG. 5, for data analysis, a user is presented with a dashboard view 500. The dashboard is initially empty and the user is prompted to load normalized records from the database. An upload button 504 enables the user to upload new files for transformation into normalized records, such as telecommunication records, cell site records, or subscriber records. The user is prompted to associated the uploaded files with a project identifier, such as a case number. A load button 506 enables the user to load normalized records for analysis. A summary bar 508 is initially empty when no records have been loaded. Referring to FIG. 6, when records are loaded into the memory of the dashboard application, the summary bar 508 is populated with a description of the data in the records, such as a total number of communications represented by the loaded records, a number of incoming communications, a number of outgoing communications, a number of calls, a number of text messages, and a number of excluded events.

Referring again to FIG. 5, subscriber information for loaded records is provided in a subscriber region 510. An example of subscriber information is shown in FIG. 7.

Referring again to FIG. 5, raw data from the loaded records is displayed in tabular form in a raw data region 512. An example raw data table is shown in FIG. 8. The raw data table can be interactive. For instance, the user can sort the data by the values in one or more of the fields, use a search functionality to find a text string, or scroll through the listing of records.

Referring again to FIG. 5, in a communication metrics region 514, metrics descriptive of communications between each target and secondary phone number pair are displayed. An example communications metric display is shown in FIG. 9.

Communication metrics can include, e.g., the date range of communications between the pair of phone numbers; the number, type, or directionality of communications; the average (e.g., mean or median) call duration or time between communications; the cumulative call duration, or other metrics. The communications metrics display can be interactive.

The dashboard of FIG. 5 can also display graphical representations of the loaded records. FIGS. 10-14 show examples of graphical representations; other graphical representations of the records can also be generated and presented. In some examples, the graphical representations can be transformed into tabular representations of the data.

Referring to FIG. 10, bar graphs display the volume of communications by hour of the day, day of the week, and direction.

Figure 11:
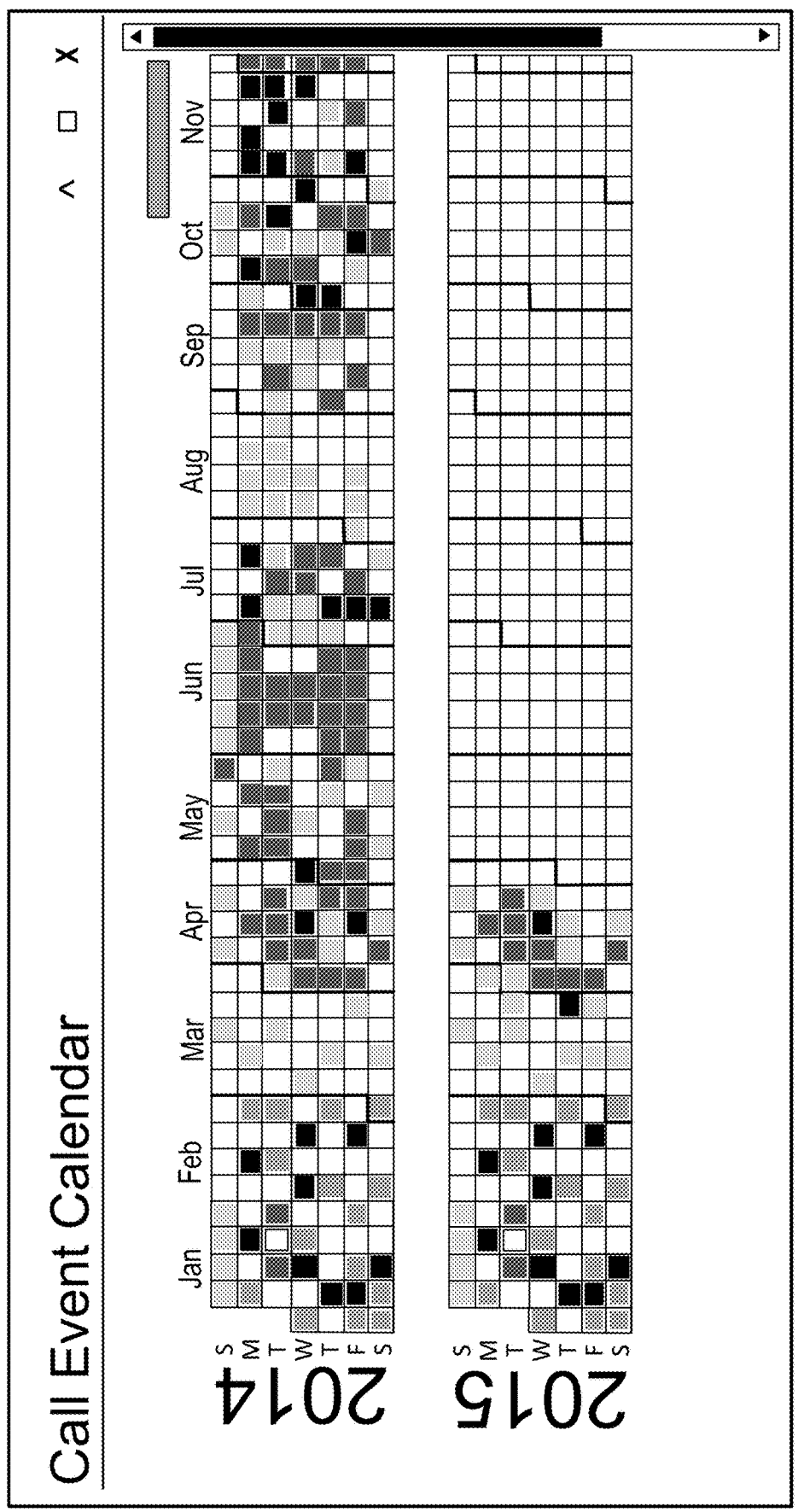

Referring to FIG. 11, a calendar heat map shows the pattern of call volume by date.

Figure 12:
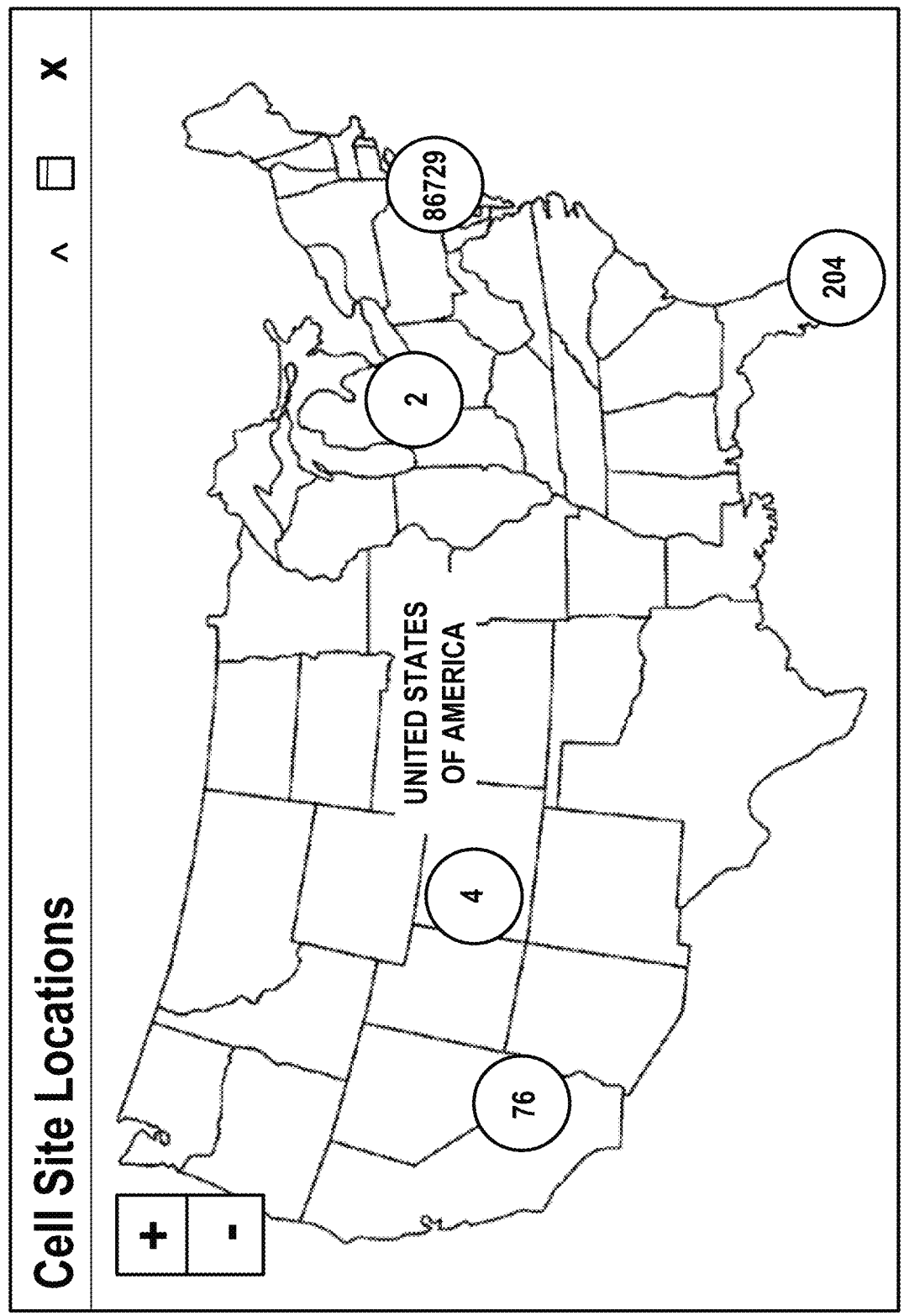

Referring to FIG. 12, a cell site map shows aggregate geographic locations of cell sites referenced in the loaded records. For instance, the cell site map can be generated using a clustering algorithm through a leaflet library. The user can interact with the cell site map, e.g., to zoom in and drill down to individual cell sites or individual communications.

Figure 13A:
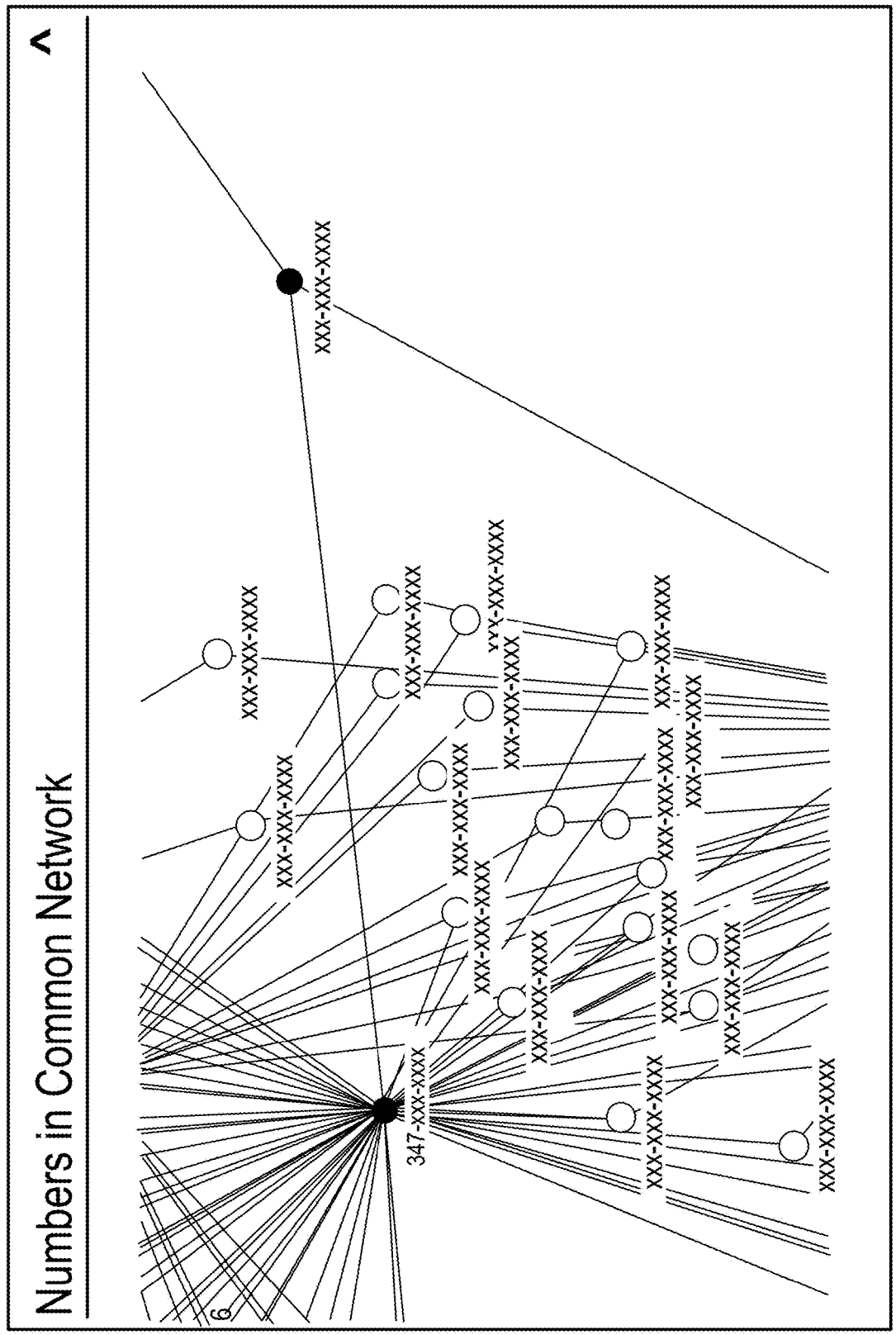

Referring to FIG. 13A, if the case contains multiple target numbers, a graphical representation of a network of secondary numbers in common among the multiple target numbers show relationships between target numbers and secondary numbers. The graphical representation can be interactive. Referring to FIG. 13B, the network of secondary numbers in common can also be displayed in tabular form.

Figure 14:
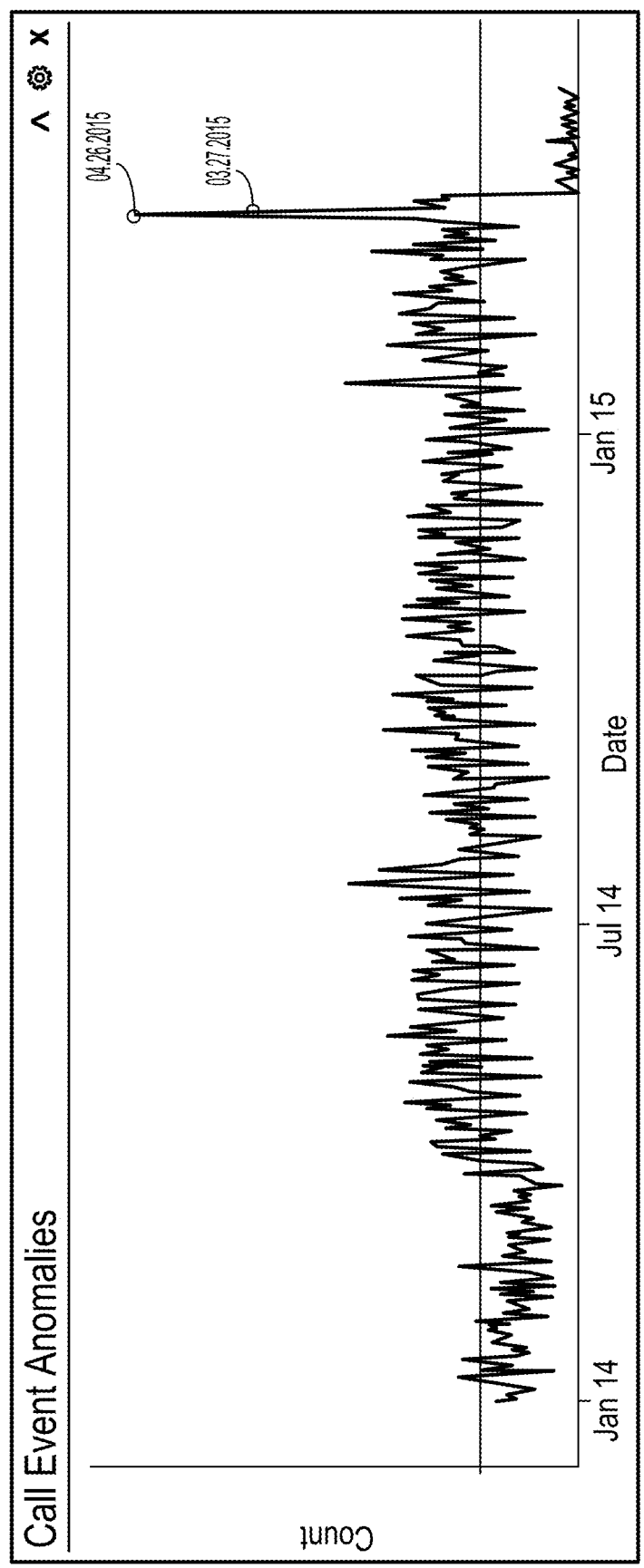

Referring to FIG. 14, a call event anomaly plot can show communications by date, enabling anomalous days to be highlighted (e.g., anomalous due to higher call volume than normal or lower call volume than normal). A horizontal line indicating average (e.g., mean or median) call volume can be provided as a reference.

Referring again to FIG. 5, various data manipulation functions are available through a menu bar 502.

Figure 15:
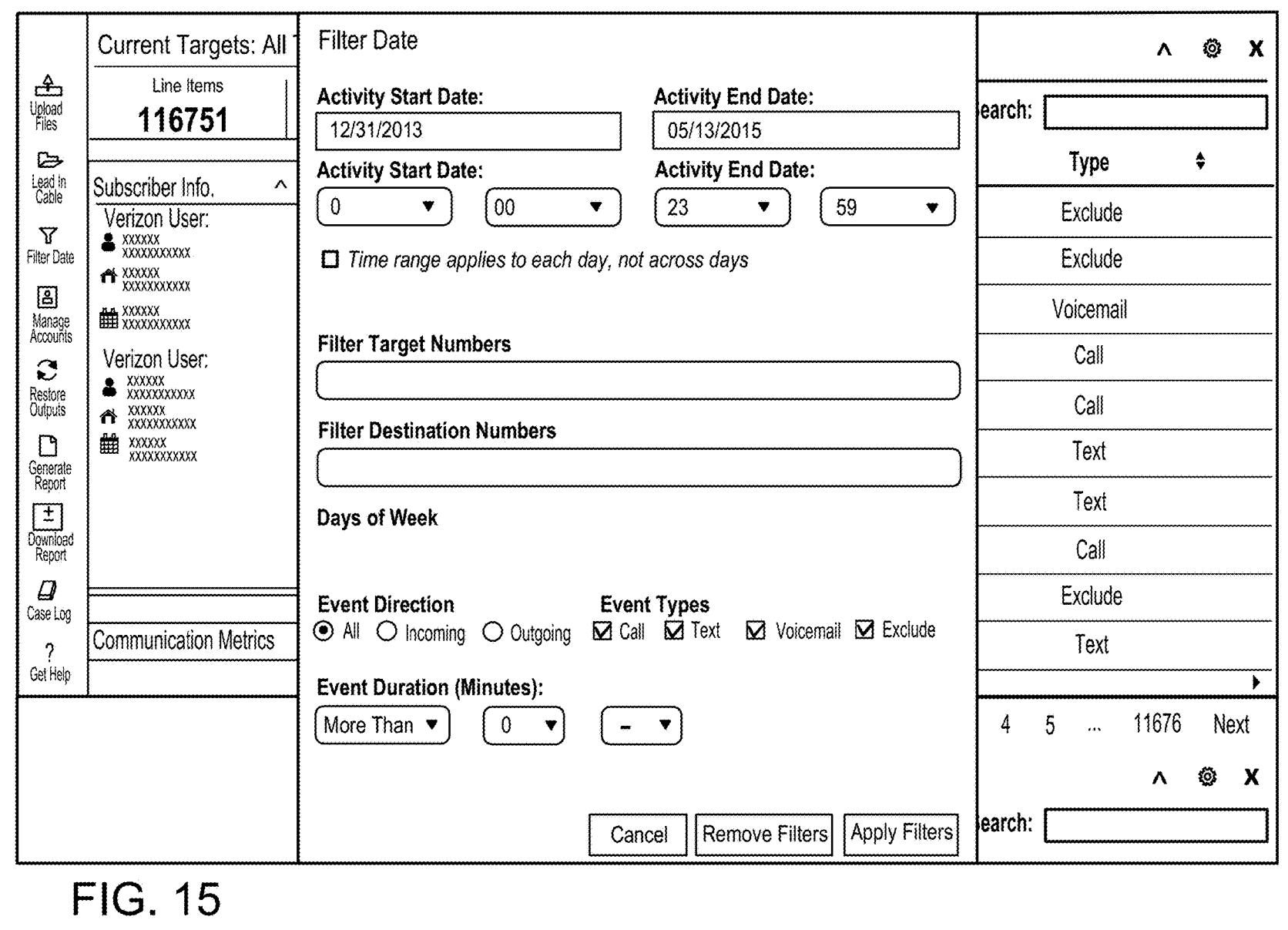

A filter button 510 launches a filter dialog that enables the user to filter the loaded records. Referring to FIG. 15, an example filter dialog enables filtering of the loaded records by date, time, phone number, day of the week, directionality (e.g., inbound to the target number or outbound from the target number), communication type, or call duration. Other filter parameters can also be used. Applying the filters requested through the filter dialog will restrict the records held in the memory of the dashboard application to only those records that satisfy the filters.

Referring again to FIG. 5, an aliases button 512 enables a user to append an alias to a telephone number. By replacing a telephone number with an alias, the displayed data can be easier to understand, e.g., facilitating the identification of communication patterns.

A report button 514 enables the user to export analysis results, e.g., in the form of an html document or other type of report. The report can be static or interactive. An example report is shown in FIG. 16.

Figure 17:
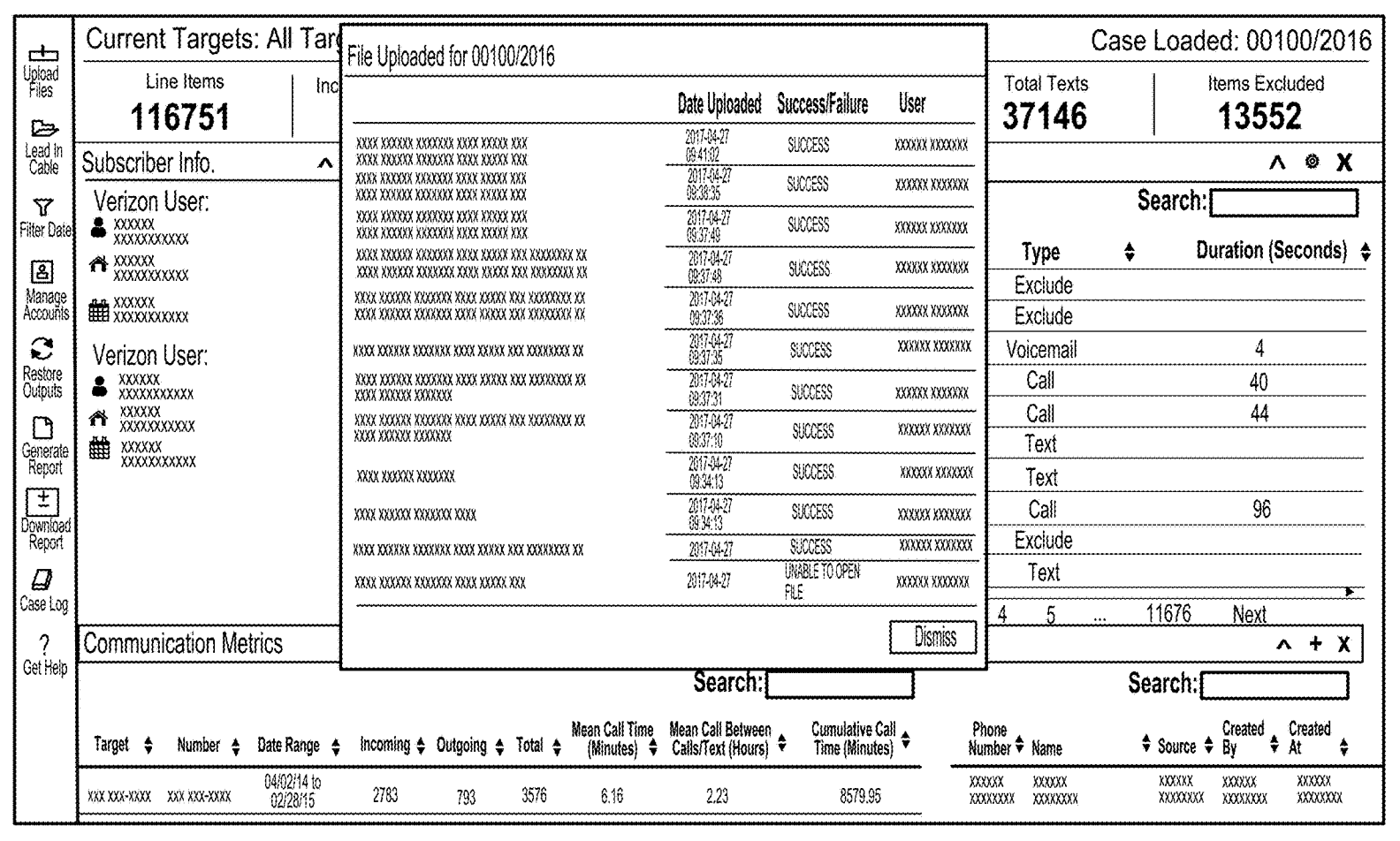

Referring again to FIG. 5, many cases involve more than one set of records, e.g., records from various telecommunication providers. A case log button 516 enables the user to view a historical log of files that were uploaded for a given case number. The history can identify records that were successfully normalized and saved to the database and records that were not normalized or saved, e.g., because the records were for an unsupported telecommunication provider or because the records were duplicative of previously normalized records. An example log is shown in FIG. 17.

A number of embodiments have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

What is claimed is:

1. A computer-implemented method for automatically parsing non-uniform telecommunication data, the method comprising:
  receiving, at one or more electronic processors, a first telecommunication record, the first telecommunication record comprising
    a listing of at least one communication between a first telecommunication device and one or more second telecommunication devices, and
    for each communication between the first telecommunication device and one or more of the second telecommunication devices: (i) a first cell site reference, (ii) a last cell site reference, (iii) communication date and time data, and (iv) one or more of: communication duration data, communication direction data, communication type data, a first telecommunication device identifier, and a second telecommunication device identifier for the one of the second telecommunication devices;
  identifying, from the first telecommunication record, a telecommunication provider associated with the first telecommunication record based on a format of the first telecommunication record, comprising:
    selecting a first cell site key from among multiple cell site keys based on the communication date and time data of the first telecommunication record, and
    parsing the selected first cell site key to identify the telecommunication provider associated with the first cell site key and to identify a time frame during which the first cell site key is applicable for mapping cell site references to geographic locations;
  based on the identified telecommunication provider, selecting, from a plurality of telecommunication provider rule sets, a first telecommunication provider rule set that defines how to transform the first telecommunication record into a normalized telecommunication record;
  transforming, by the one or more electronic processors, the first telecommunication record according to the selected first telecommunication provider rule set to generate the normalized telecommunication record, wherein transforming the first telecommunication record further comprises a) mapping the first cell site reference and the last cell site reference of the first telecommunication record to geographic locations identified by the parsing of the first cell site key and b) appending the geographic locations to the first telecommunication record; and generating, from the normalized telecommunication record, an interactive report that displays a relationship between the first telecommunication device and the one or more second telecommunication devices.

2. The computer-implemented method of claim 1, wherein generating the normalized telecommunication record comprises:

deriving, for each communication within the normalized telecommunication record, a unique identifier based on information associated with the communication.

3. The computer-implemented method of claim 2, comprising:

applying a filter to the normalized telecommunication record and to previously normalized telecommunication records stored in a database to determine whether one or more communications within the normalized telecommunication record are duplicates of one or more communications within the previously normalized telecommunication records; and responsive to determining that one or more communications within the normalized telecommunication record are not duplicates, storing the one or more communications within the normalized telecommunication record in the database.

4. The computer-implemented method of claim 2, wherein deriving the unique identifier is based on at least one of a portion of the communication duration data, a portion of the communication direction data, a portion of the communication type data, a portion of the communication date and time data, and the first telecommunication device identifier.

5. The computer-implemented method of claim 1, comprising:

computing a first hash of the first telecommunication detail record;

comparing, prior to identifying the telecommunication provider, the first hash against a previously computed hash associated with a previously normalized telecommunication record; and when the first hash is different from the previously computed hash, allowing identification of the telecommunication provider to proceed.

6. The computer-implemented method of claim 1, wherein the communication type data comprises an identifier as to whether a communication is an answered phone call, a text message, a phone call routed to voicemail, or an excluded event.

7. The computer-implemented method of claim 1, wherein the first telecommunication device identifier comprises a first telephone number, and wherein the one or more second telecommunication device identifiers comprises one or more additional telephone numbers, respectively.

8. The computer-implemented method of claim 1, wherein the communication direction data comprises information as to whether a communication is an outbound communication from the first telecommunication device or an inbound communication to the first telecommunication device.

9. The computer-implemented method of claim 1, further comprising selecting, prior to mapping the first cell site reference and the last cell site reference, the first cell site key from a plurality of cell site keys based on the communication date and time data within the first telecommunication record.

10. A computing system for automatically parsing non-uniform telecommunication data, the computing system comprising:

one or more electronic processors coupled to a memory, the electronic processors and memory configured to:

receive a first telecommunication record comprising a listing of at least one communication between a first telecommunication device and one or more second telecommunication devices, and for each communication between the first telecommunication device and one or more of the second telecommunication devices: (i) a first cell site reference, (ii) a last cell site reference, (iii) communication date and time data, and (iv) one or more of: communication duration data, communication direction data, communication type data, a first telecommunication device identifier, and a second telecommunication device identifier for the one of the second telecommunication devices;

identify, from the first telecommunication record, a telecommunication provider associated with the first telecommunication record based on a format of the first telecommunication record, comprising:

selecting a first cell site key from among multiple cell site keys based on the communication date and time data of the first telecommunication record, and parsing the selected first cell site key to identify the telecommunication provider associated with the first cell site key and to identify a time frame during which the first cell site key is applicable for mapping cell site references to geographic locations;

based on the identified telecommunication provider, select, from a plurality of telecommunication provider rule sets, a first telecommunication provider rule set that defines how to transform the first telecommunication record into a normalized telecommunication record;

transform the first telecommunication record according to the selected first telecommunication provider rule set to generate the normalized telecommunication record, wherein transforming the first telecommunication record further comprises a) mapping the first cell site reference and the last cell site reference of the first telecommunication record to geographic locations identified by the parsing of the first cell site key and b) appending the geographic locations to the first telecommunication record; and generate, from the normalized telecommunication record, an interactive report that displays a relationship between the first telecommunication device and the one or more second telecommunication devices;

one or more databases configured to store the plurality of telecommunication rule sets and the normalized telecommunication record.

11. The computing system of claim 10, wherein generating the normalized telecommunication record comprises:

deriving, for each communication within the normalized telecommunication record, a unique identifier based on information associated with the communication.

12. The computing system of claim 11, wherein the electronic processors and memory are configured to:

apply a filter to the normalized telecommunication record and to previously normalized telecommunication records stored in the database to determine whether one or more communications within the normalized telecommunication record are duplicates of one or more communications within the previously normalized telecommunication records; and responsive to determining that one or more communications within the normalized telecommunication record are not duplicates, store the one or more communications within the normalized telecommunication record in the database.

13. The computing system of claim 11, wherein deriving the unique identifier is based on at least one of a portion of the communication duration data, a portion of the communication direction data, a portion of the communication type data, a portion of the communication date and time data, and the first telecommunication device identifier.

14. The computing system of claim 10, wherein the electronic processors and memory are configured to:

compute a first hash of the first telecommunication detail record;

compare, prior to identifying the telecommunication provider, the first hash against a previously computed hash associated with a previously normalized telecommunication record stored in the database; and when the first hash is different from the previously computed hash, allow identification of the telecommunication provider to proceed.

15. The computing system of claim 10, wherein the communication type data comprises an identifier as to whether a communication is an answered phone call, a text message, a phone call routed to voicemail, or an excluded event.

16. The computing system of claim 10, wherein the first telecommunication device identifier comprises a first telephone number, and wherein the one or more second telecommunication device identifiers comprises one or more additional telephone numbers, respectively.

17. The computing system of claim 10, wherein the communication direction data comprises information as to whether a communication is an outbound communication from the first telecommunication device or an inbound communication to the first telecommunication device.

18. The computing system of claim 10, wherein the electronic processors and memory are configured to select, prior to mapping the first cell site reference and the last cell site reference, the first cell site key from a plurality of cell site keys based on the communication date and time data within the first telecommunication record.

\* \* \* \* \*